(12) United States Patent
Miyazawa et al.

(10) Patent No.: US 7,817,910 B2
(45) Date of Patent: Oct. 19, 2010

(54) IMAGING APPARATUS

(75) Inventors: Hiroshi Miyazawa, Nagano (JP);
Kunihiko Kanai, Nagano (JP); Hideo Nakamura, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 826 days.

(21) Appl. No.: 11/685,938

(22) Filed: Mar. 14, 2007

(65) Prior Publication Data
US 2007/0253695 A1   Nov. 1, 2007

(30) Foreign Application Priority Data

Apr. 28, 2006 (JP) .............................. 2006-126567
Aug. 31, 2006 (JP) .............................. 2006-234751

(51) Int. Cl.
G03B 3/00 (2006.01)
G03B 15/03 (2006.01)
G03B 7/08 (2006.01)
H04N 3/14 (2006.01)
H04N 5/222 (2006.01)

(52) U.S. Cl. ..................... 396/96; 396/157; 396/234; 348/324; 348/371

(58) Field of Classification Search ............... 396/157, 396/96
See application file for complete search history.

(56) References Cited

U.S. PATENT DOCUMENTS 6,240,252 B1 * 5/2001 Yamaguchi et al. ........... 396/61

6,377,753 B1 * 4/2002 Matsumoto ................. 396/96
6,714,734 B2   3/2004 Muramatsu ................ 396/157
6,904,233 B2 * 6/2005 Fukui ........................ 396/61
6,922,528 B2   7/2005 Okabe ....................... 396/157
7,653,299 B2 * 1/2010 Miyazawa et al. ........... 396/234

FOREIGN PATENT DOCUMENTS

| JP | 2003-114465 | 4/2003 |
| JP | 2004-272071 | 9/2004 |
| JP | 2005-115161 | 4/2005 |

* cited by examiner

*Primary Examiner*—Melissa J Koval
(74) *Attorney, Agent, or Firm*—Thomas J. Strouse; Peyton C. Watkins

(57) ABSTRACT

An imaging apparatus includes an image sensor; a strobe unit; a preliminary. illumination controller which instructs the strobe unit to preliminarily illuminate for a predetermined period before main illumination; a reading controller which divides the image sensor into a plurality of regions, controls an exposure period for each region, corresponding to the preliminary illumination, and reads an image signal from each of the regions; and an imaging exposure setting unit which sets an appropriate amount of strobe light to be fired during imaging according to the image signals read from the regions; wherein the reading controller controls the exposure period for each region so that an overlapping period with the preliminary illumination period of the strobe unit is different from each other.

3 Claims, 10 Drawing Sheets

IMAGING APPARATUS

CROSS REFERENCE TO RELATED APPLICATIONS

This application claims priority to Japanese Patent Application Nos. 2006-126567 filed on Apr. 28, 2006 and 2006-234751 filed on Aug. 31, 2006, which are incorporated herein by reference in their entirety.

FIELD OF THE INVENTION

The present invention relates to an imaging apparatus, and more particularly to photometric measurement of brightness of a subject.

BACKGROUND OF THE INVENTION

When a subject is photographed with a digital camera, there has hitherto been a case where the brightness of a subject exceeds a dynamic range of an image sensor when photometric measurement is performed with brightness of the subject being unknown, as in the initial start-up stage of a digital camera, switching of a photography mode, e.g., from a review mode to a photography mode, and the like. In such a case, photographing is performed a plurality of times while exposure conditions are being altered, in order to perform photographing operation under appropriate exposure conditions.

In a case where photographing is performed with strobe light being fired, there arises a case where, when the amount of light of the strobe is adjusted by use of firing of preliminary light (strobe light control), photometric measurement over a long range cannot be carried out by a single firing of preliminary light because of limitations on the dynamic range of an image sensor. Even in this case, preliminary flash light is fired a plurality of times while firing conditions are changed. Moreover, in the case of high photographic sensitivity or a high flash guide number, a strobe range becomes longer. When the dynamic range of the image sensor is narrow, there arises a case where photometric measurement cannot be carried out by a single firing of preliminary flash light. Even in this case, preliminary flash light must be fired a plurality of times with the amount of light being changed.

FIG. 8 shows an operation timing chart which is used to set the amount of light to be fired by means of the main flash by firing preliminary flash light a plurality of times. The chart is illustrated while being generally divided into a monitoring period before photography, an evaluation period for controlling the amount of strobe light, and a still image photographing period which is the main photography operation. During the monitoring period, electric charges accumulated in an image sensor such as a CCD are transferred and read as an image signal, and the image signal is subjected to image processing such as compression. The processed image signal is displayed on a display device such as an LCD or the like. A vertical synch signal VD is a signal output of every screen of the CCD, and is generated by a timing generator. In synchronism with the vertical synch signal VD, a read pulse SG is supplied to the image sensor, thereby determining read timing. After unwanted electric charges accumulated in the CCD are swept out by means of a sweep pulse signal Sub, exposure is initiated. The accumulated electric charges are sequentially read from the CCD by means of a vertical transfer clock signal VT. During an amount-of-strobe-light detection and evaluation period, a strobe built in or externally attached to the digital camera is driven, to thus effect a first firing of preliminary flash light (preliminary flash) (preliminary flash light 1 in the drawing). The electric charges accumulated in the CCD in the interim are read as an image signal. The thus-read image signal is provided not for display purposes but for photometric measurement purposes. A controller or a microprocessor of the digital camera determines the amount of a second firing of preliminary flash light, on the basis of the result of photometric measurement. In the drawing, the amount of the second firing of preliminary flash light (preliminary flash light 2) is made greater than the amount of the first firing of preliminary flash light. Read timing is determined by the read pulse signal SG, and unwanted electric charges are swept out by the sweep pulse signal Sub, and exposure is initiated. The electric charges accumulated in the CCD during the period of the second firing of preliminary flash light are read as an image signal by use of a vertical transfer clock signal VT. The thus-read image signal is provided not for display purposes but for photometric measurement purposes. On the basis of the first and second firings of preliminary flash light, the controller determines the amount of flash light fired as the main flash, thereby photographing a still image.

Japanese Patent Laid-Open Publication No. 2003-114465 provided below mentions that, when the amount of light based on the first firing of preliminary light (preliminary flash light) is a predetermined value or less, second preliminary flash light is fired while the intensity of flash light is made greater, thereby setting a guide number.

Japanese Patent Laid-Open Publication No. 2004-272071 mentions that intermittent preliminary flash light is fired by means of a PWM trigger pulse signal.

Japanese Patent Laid-Open Publication No. 2005-115161 mentions that the number of times preliminarily flash light is fired and the amount of preliminary flash light are set on the basis of the maximum guide number and the minimum guide number of a strobe as well as on the basis of a dynamic range of a sensor in a dimmer circuit.

However, a configuration for effecting photography a plurality of times or firing preliminary light a plurality of times presents a problem of photoelectric measurement that takes a long time. Moreover, when preliminary light is fired a plurality of times, many electric charges accumulated in a capacitor provided in a strobe firing control circuit are consumed, thereby posing a problem of a decrease in the guide number during main photography.

SUMMARY OF THE INVENTION

The present invention has been conceived in light of drawbacks in the related art, and provides an imaging apparatus which completes photoelectric measurement by means of single photography or single preliminary flash light and enables performance of photography.

The present invention provides an imaging apparatus comprising:
an image sensor;
a reading unit for dividing the image sensor into a plurality of regions and exposing the respective regions at different imaging exposure settings, thereby reading an image signal from each of the regions; and
a control unit for setting an appropriate imaging exposure for photography in accordance with each of the image signals which have been read from the respective regions and differ from each other in terms of exposure.

The present invention also provides an imaging apparatus comprising:
an image sensor; and a control unit for dividing the image sensor into at least a first region and a second region and reading an image signal from each of the first and second regions while changing electric charge accumulation times for the respective first and second regions, thereby simultaneously acquiring at least two image signals of different exposure.

The present invention further provides an imaging apparatus comprising:

an image sensor;

a strobe for lighting a scene to be photographed; and a control unit for dividing the image sensor into at least a first region and a second region and reading an image signal from each of the first and second regions while changing electric charge accumulation times required in the respective first and second regions when the strobe fires flash light in such a way that at least any one of the electric charge accumulation times comes to an arbitrary point in time during firing of the strobe, thereby simultaneously acquiring at least two image signals which differ from each other in terms of the amount of flash light fired by the strobe.

According to the present invention, an image sensor is divided into a plurality of regions, and imaging exposure or an electric charge accumulation time in each of the regions is changed, whereby a plurality of image signals having different imaging exposures can be obtained by means of a single exposure. Consequently, exposure does not need to be performed a plurality of times while exposure conditions are being changed, and hence a photometric measurement time or a shooting time can be shortened. In short, the present invention enables acquisition of an image of appropriate exposure in a short period of time.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTIONS OF THE PREFERRED EMBODIMENTS

Embodiments of the present invention will be described hereinbelow by means of taking a digital camera as an example, with reference to the drawings.

First Embodiment

Figure 1:
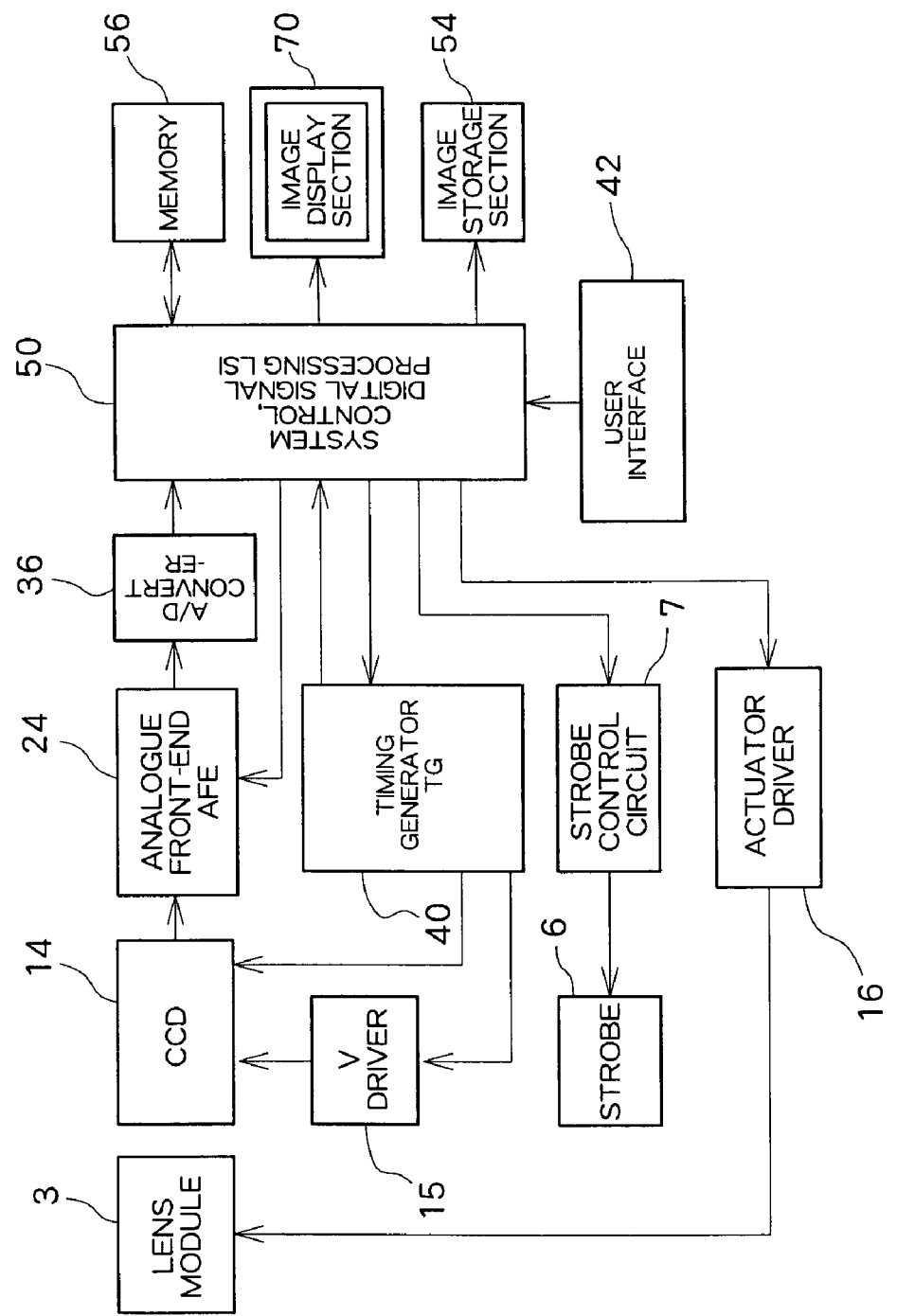
FIG. 1 is a block diagram showing the configuration of an imaging apparatus according to an embodiment of the present invention.

FIG. 1 is a block diagram showing the configuration of a digital camera according to an embodiment of the present invention. The digital camera includes an imaging assembly, and the imaging assembly has a lens module 3 for forming an image of a scene on a CCD 14. The lens module 3 comprises a lens, an aperture mechanism, a shutter mechanism, a focusing mechanism, a zooming mechanism, and actuators for actuating the aperture mechanism, the shutter mechanism, the focusing mechanism, and the zooming mechanism. The actuators of the respective mechanisms are controlled by an actuator driver 16. A short focus lens may also be used in lieu of the zoom lens.

The CCD 14 is a color megapixel CCD sensor of single chip, and has a known Bayer arrangement color filter used for photographing a color image.

A timing generator TG 40 supplies the CCD 14 with a drive signal in order to drive the CCD 14 in various operation modes. A V driver 15 takes charge of receiving a high-voltage, heavy-load portion of a drive signal output from the timing generator TG 40. In accordance with a command from a system control digital signal processing LSI 50 which controls the entire system in an integrated manner, the timing generator TG 40 controls the CCD 14.

In response to a command from a strobe light control circuit 7, a strobe 6 fires flash light as required. In response to a command from the system control digital signal processing LSI 50, the strobe light control circuit 7 controls firing of the strobe 6. The strobe light control circuit 7 includes a capacitor for accumulating high-voltage electric charges. The system control digital signal processing LSI 50 causes the strobe 6 to preliminarily fire light, receives light reflected from a subject, evaluates the brightness of the subject, and according to the result of evaluation determines the amount of light fired during main flash. Conventionally, the strobe 6 preliminarily fires light a plurality of times, to thus effect TTL light control. In contrast, in the present embodiment, firing of preliminary flash light performed by the strobe 6 is limited to one operation. In the present embodiment, for the sake of convenience, division of the regions of the CCD 14 is explained by reference to a case where the strobe 6 is not driven. Preliminary firing of the strobe 6 is described in a second embodiment and embodiments subsequent thereto.

A user interface 42 includes a power button, a release button, a mode setting switch, and the like, and is used for controlling operation of the digital camera. A signal entered by way of the user interface 42 is supplied to the system control digital signal processing LSI 50. When the brightness of the subject is unknown and photometric measurement is required as in the initial startup stage of the digital camera, switching of the modes, and the like, the system control digital signal processing LSI 50 commands the timing generator 40 to divide the CCD 14 into a plurality of regions and adjust imaging exposure.

An analogue image signal read from the CCD 14 is supplied to an analogue front-end AFE 24. The analogue front-end AFE 24 subjects the analogue image signal to correlated double sampling and amplification processing, and supplies the thus-processed signal to an A/D converter 36. The A/D converter 36 converts an analogue image signal into a digital image signal, and supplies the thus-converted signal to the system control digital signal processing LSI 50.

In addition to controlling the entire system in an integrated manner, the system control digital signal processing LSI 50 is supplied with an input of an image signal and performs color correction and tone correction in order to generate sRGB data. The sRGB data are compressed into an image format such as JPEG and the like, and are stored as JPEG data or RAW data into an image recording section 54. The thus-processed image is output to and displayed on an image display section 70 such as an LCD or the like. Memory 56 is used as auxiliary memory for temporarily storing image data, image processing, and the like or used for storing a program command set, or the like, of the system control digital signal processing LSI 50.

In the present embodiment, with such a configuration, the CCD 14 is divided into a plurality of regions during photoelectric measurement, and read signals which differ from each other in terms of timing for the respective regions are supplied, thereby reading a plurality of image signals having different imaging exposures. Specifically, the CCD 14 is divided into two regions; namely, an odd-number line region formed from odd-number lines and an even-number line region formed from even-number lines. Timing for reading accumulated electric charges from the odd-number line region is shifted from timing for reading accumulated electric charges from the even-number line region, thereby changing imaging exposure. The term "division of the CCD 14" employed herein signifies logical division rather than physical division, and also means that a plurality of regions from which image signals are read at different times are present. In the CCD 14, the divided regions are equal to each other in terms of pixel size and sensitivity.

Figure 2:
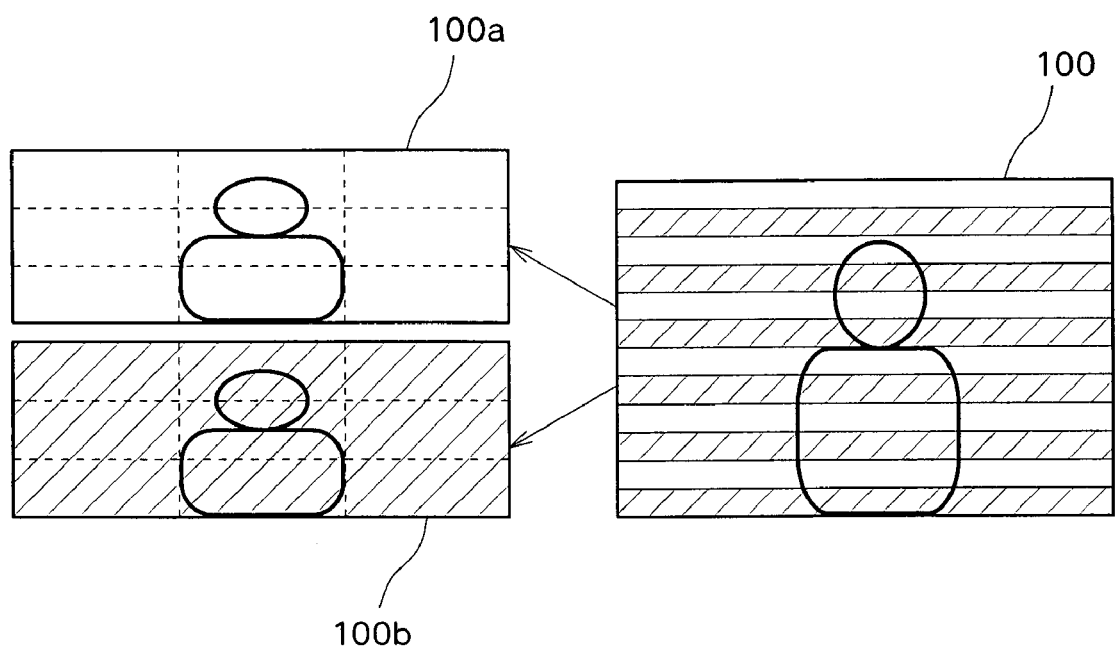
FIG. 2 is a view for describing division of a CCD region.

FIG. 2 schematically shows division of the CCD 14 of the present embodiment. An entire area 100 of the CCD 14 is divided into an odd-number line region 100a and an even-number line region 100b. The imaging exposure of the odd-number line region in the CCD 14 differs from that of the even-number line region, and the imaging exposure of the even-number line region is made greater than that of the odd-number line region. The timing generator TG 40 changes electric charge read timing such that the time required to accumulate electric charges in the even-number line region becomes longer than the time required to accumulate electric charges in the odd-number line region, and supplies the electric charge read timing to the respective regions of the CCD 14. In the present embodiment, two image signals which differ from each other in terms of imaging exposure can be obtained through a single photography operation. These image signals are evaluated, whereby the dynamic range of the CCD 14 is substantially expanded, and appropriate imaging exposure can be quickly determined. Until now, two preliminary photographing operations for photometric measurement have been required before main photography. In contrast, in the present embodiment, only one preliminary photographing operation is required before main photography.

Figure 3:
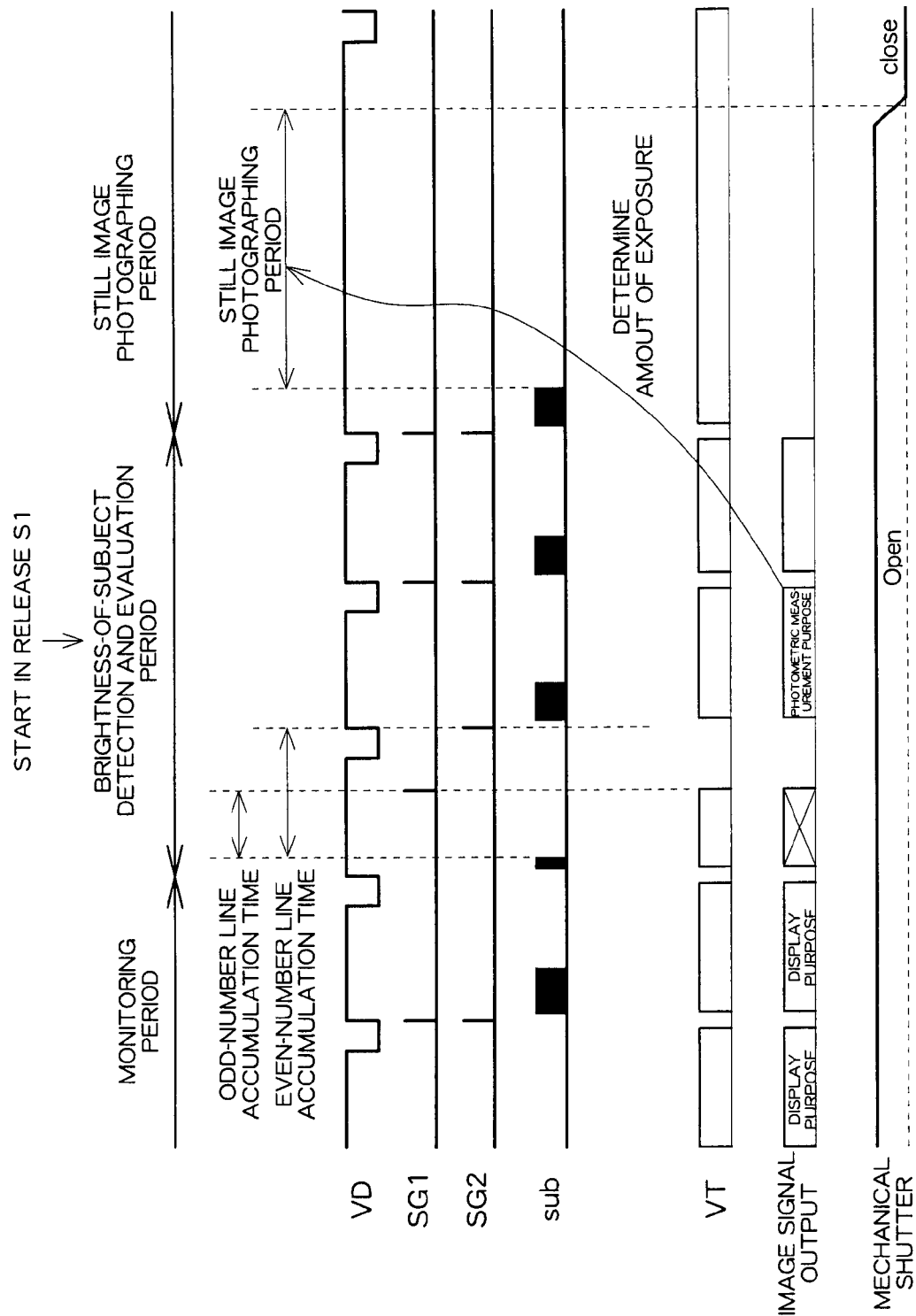
FIG. 3 is an operation timing chart of the embodiment.
Figure 8:
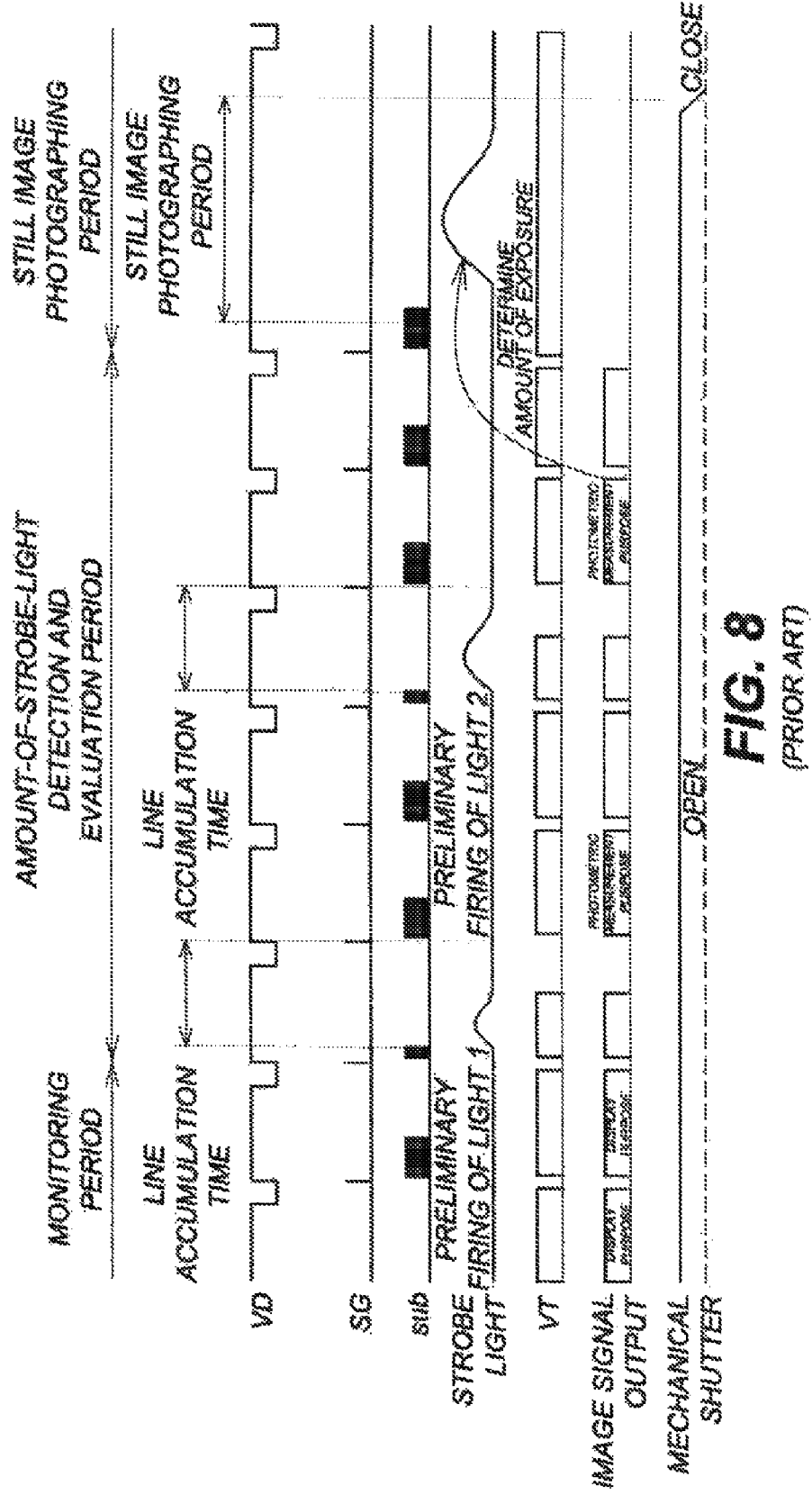
FIG. 8 is an operation timing chart of a conventional imaging apparatus.

FIG. 3 shows an operation timing of the imaging apparatus of the present embodiment, corresponding to FIG. 8 showing an operation timing of the conventional imaging apparatus.

In the drawing, two pulse signals SG1 and SG2 are supplied as read pulse signals to the CCD 14. The read pulse signal SG1 is for reading accumulated electric charges from the odd-number line region of the CCD 14. The read pulse signal SG2 is for reading accumulated electric charges from the even-number line region of the CCD 14. As in the case of the SG signal shown in FIG. 8, the read pulse signal SG2 has timing synchronous with the vertical sync signal VD. By means of a Sub pulse signal, which is a so-called electronic shutter pulse, subsequent to the read pulse signal SG2, unwanted electric charges accumulated in a photodiode of a photo-sensitive section in the CCD 14 are swept to a substrate to thus reset the photodiode, and exposure is commenced. In the drawing, hatched areas depict input of a plurality of Sub pulse signals and sweeping of electric charges to the substrate as the occasion arises, to thus reset the photodiode. A period of time—from when a final pulse in a group of Sub pulses ends until when the next read pulse signals SG1 and SG2 are input—corresponds to an exposure time. By means of a brightness detection operation which is started when a release button is depressed halfway down (S1), a difference is intentionally caused to arise between the imaging exposure of the odd-number lines and the imaging exposure of the even-number lines, by means of changing the output timing of the pulse signal SG1 and that of the pulse signal SG2. In order to prevent the existence of unwanted electric charges in the odd-number lines and the even-number lines at the start of brightness detection exposure, the pulse signals SG1, SG2 have not been input beforehand (indicated by broken lines in the drawing). The pulse signal SG1 is input at a time when electric charges are accumulated in the odd-number lines for a required period of time, and the signal electric charges in the odd-number lines are read to a vertical transfer path of the CCD 14. Subsequently, the pulse signal SG2 is input at a time when electric charges are accumulated in the even-number lines for a required period of time, and signal electric charges in the even-number lines are read to the vertical transfer path. A vertical transfer clock signal VT, which is a transfer signal for the vertical transfer path, is in a pause status from when the preceding pulse signal SG1 is input until when the subsequent pulse signal SG2 is input. As a result, frames of the odd-number lines and frames of the even-number lines, which differ from each other in terms of brightness, are formed in the vertical transfer path as shown in FIG. 2. Signals of this format are sequentially read to the outside by the CCD 14 by means of a subsequent vertical transfer clock signal VT.

During a duration of the vertical sync signal VD or at about half timing of the cycle of the vertical sync signal VD in the drawing, the pulse signal SG1 is supplied to the CCD 14. Electric charges are only accumulated and read during a period corresponding to about one-half a vertical synchronization period. In other words, electric charges are accumulated in the odd-number line region for an exposure time which is about one-half the exposure time required for the even-number line region, and the thus-accumulated electric charges are read as a signal for photometric measurement. The system control digital signal processing LSI 50 determines appropriate imaging exposure from the image signal from the odd-number line region and the image signal from the even-number line region, the two regions differing from each other in terms of imaging exposure.

As mentioned above, in the present embodiment, two images having different imaging exposures can be simultaneously acquired by a single exposure by means of changing the read timing. Accordingly, when compared with a case where photography operation is performed a plurality of times every time imaging exposure is changed, a photometric measurement time can be shortened. Further, the dynamic range of the CCD 14 can be extended.

In the present embodiment, the imaging exposure of the odd-number line region is made about one-half the imaging exposure of the even-number line region. However, the read timing of the odd-number line region is advanced, so that the exposure time can be shortened and that the imaging exposure of the odd-number line region can be reduced to one-third, one-fourth, or the like, of the imaging exposure of the even-number line region. As a matter of course, the imaging exposure of the odd-number line region can also be increased to twice, triple, quadruple, or the like, of the imaging exposure of the even-number line region.

In the present embodiment, the CCD 14 is divided into two regions; i.e., the odd-number line region and the even-number line region. If necessary, the CCD can be divided into three segments, four segments, or the like. When the CCD is divided into three segments, lines of the CCD 14 are numbered, sequentially from the top, 0, 1, 2, 0, 1, 2, 0, 1, 2 . . . (a residue system of three). Read timing for a line region to which number "0" belongs, read timing for a line region to which number "1" belongs, and read timing for a line region to which number "2" belongs are changed from each other, thereby adjusting an exposure time. For instance, one-third of the vertical sync signal VD is read and set as read timing for the line region to which number "0" belongs; one-half of the vertical sync signal VD is read and set as read timing for the line region to which number "1" belongs; and the vertical sync signal VD is read and set as read timing for the line region to which number "2" belongs.

Moreover, in the present embodiment, the imaging exposure is changed from the odd-number line region to the even-number line region for the purpose of photometric measurement, and the image signals read from the respective regions are used as the photometric measurement signals. However, the read image signals may be utilized in unmodified forms, thereby effecting autobracket photography for photographing a plurality of images which differ from each other in terms of exposure conditions. Specifically, the image signal read from the odd-number line region and the image signal read from the even-number line region are supplied via the analogue front-end AFE 24 and the A/D converter 36 to the system control digital signal processing LSI 50, where the signals are subjected to image processing. The thus-processed image signals are displayed in parallel on the image display section 70 or stored in the image recording section 54. The user can visually ascertain two images of different imaging exposures by single photography, and can select any desirable one from them. The vertical resolution of an image of the odd-number line region or the vertical resolution of an image of the even-number line region is reduced to half of the original vertical resolution. Hence, the image may also be subjected to processing, where the image is interpolated by means of an average value of adjacent lines. When the user has selected any one of images by use of the user interface 42, the system control digital signal processing LSI 50 determines the imaging exposure of the selected image as an appropriate imaging exposure.

Second Embodiment

In the first embodiment, the read timings of the plurality of regions in the CCD 14 are changed from one region to another region regardless of operation of the strobe 6, thereby changing imaging exposure. The present embodiment describes a case where strobe light control is performed by means of changing read timings in connection with firing timing of the strobe 6.

Figure 4:
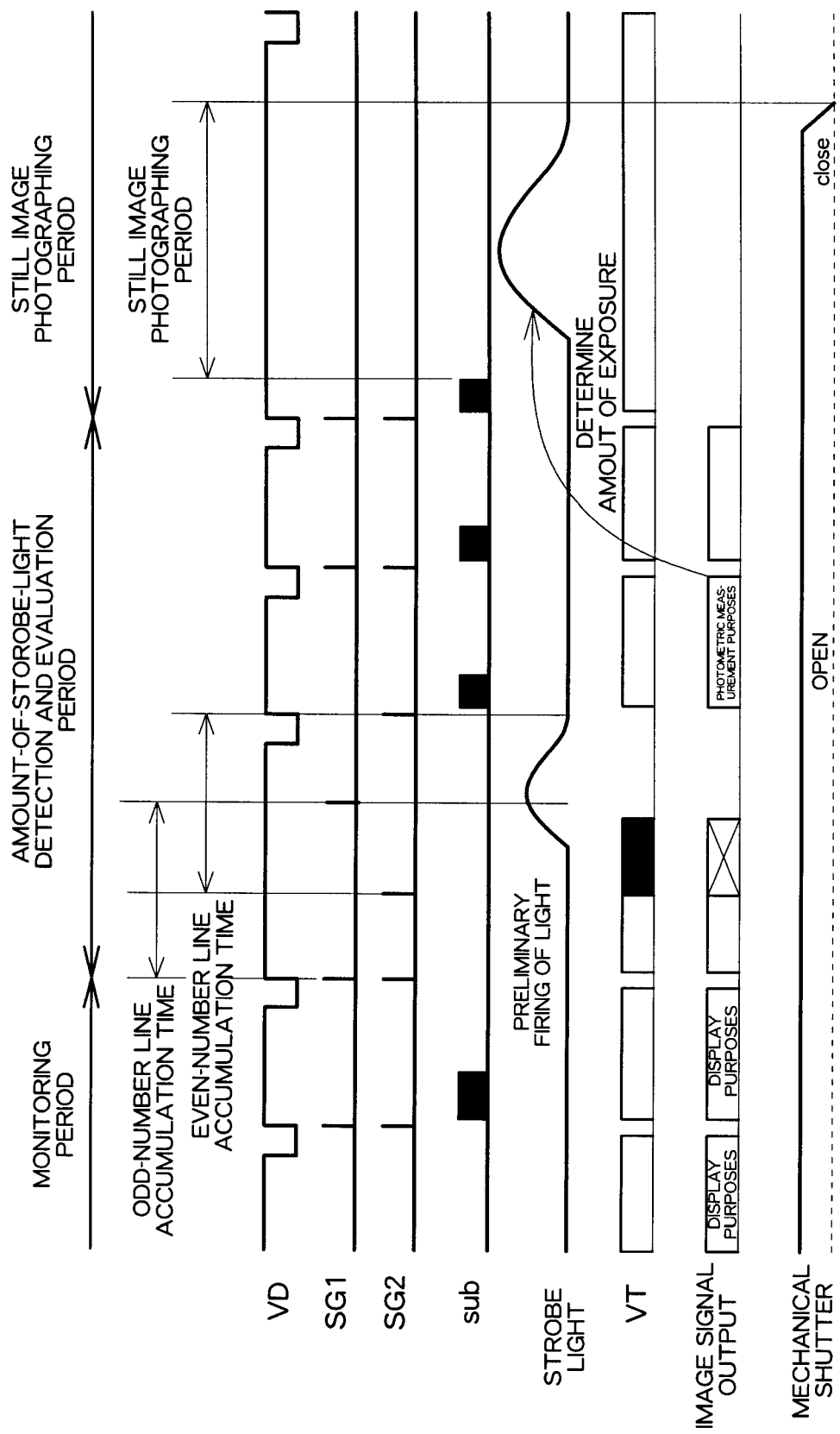
FIG. 4 is an operation timing chart of another embodiment.

FIG. 4 shows an operation timing of the present embodiment. The system control digital signal processing LSI 50 controls the strobe 60 to thus fire preliminary flash light; evaluates the brightness of the subject achieved during firing of preliminary flash light; and adjusts the imaging exposure of main flash. The CCD 14 is divided into an odd-number line region and an even-number line region. First, unwanted electric charges accumulated in the photodiode of the photosensitive section in the odd-number line region are read and swept to the vertical transfer path by means of the pulse signal SG1, whereby the photodiode is reset and exposure of the odd-number lines is commenced. After elapse of a given period of time, the photodiode of the photosensitive section in the even-number line region is similarly reset by the pulse signal SG2, and exposure of the even-number line region is commenced. Subsequently, by means of the pulse signal SG1 that is again input after lapse of a given period of time, the signal electric charges in the odd-number lines are read to the vertical transfer path, whereupon exposure of the odd-number lines ends. Before completion of exposure of the odd-number lines, unwanted excessive electric charges existing in the vertical transfer path are swept by the high-speed vertical transfer VT clock signal, whereby the photodiode is reset. Hatched areas indicated by the vertical transfer clock signal VT depict sweeping operations. As in the case of the first embodiment, after the signal electric charges have been read to the vertical transfer path by the pulse signal SG1, the vertical transfer clock signal VT is paused from when exposure of the even-number lines is completed by the pulse signal SG2 until when the signal electric charges in the even-number lines are read to the vertical transfer path. The odd-number lines and the even-number lines are equal to each other in terms of exposure time. However, the second signal read pulse signal SG1 of the odd-number line is input during a period in which the strobe fires preliminary light, and hence exposure is completed during the course of firing of preliminary flash light. Meanwhile, electric charges are accumulated in the even-number line region until completion of firing of preliminary flash light. Accordingly, the odd-number line region and the even-number line region are made different from each other in terms of imaging exposure, by means of single firing of preliminary flash light. In other words, the odd-number line region and the even-number line region differ from each other in terms of the amount of light fired through preliminary flash light. The image signal read from the odd-number line region and the image signal read from the even-number line region are supplied, as a photometric measurement signal, to the system control digital signal processing LSI 50. The system control digital signal processing LSI 50 determines an optimum amount of light to be fired, according to the result of evaluation of the odd-number line region and the even-number line region, and sets the amount of main flash light fired during photographing of a still image.

In the present embodiment, one read timing is set at a point in time in the middle of firing of preliminary flash light, and the other read timing is set to a point in time after completion of firing of preliminary flash light, whereby two images of different imaging exposures can be simultaneously acquired by means of single firing of preliminary light. Specifically, two images of different amounts of preliminarily flash light can be concurrently acquired. Consequently, when compared with a case where preliminary flash light is fired a plurality of times every time imaging exposure is changed, a photometric measurement time can be shortened. Moreover, firing of preliminary flash light can be limited to one operation, whereby electric discharge of a capacitor in the strobe firing control circuit is reduced, thereby preventing a decrease in the guide number employed at the time of firing of main flash light.

Even in the present embodiment, as in the case of the first embodiment, the read timing of the odd-number line region is changed arbitrarily and can be set to another arbitrary timing which is one-third or two-thirds of the preliminary light firing period as well as to essentially the middle of the preliminary light firing period. Moreover, the CCD 14 may also be divided into three or more segments rather than two segments.

Figure 7:
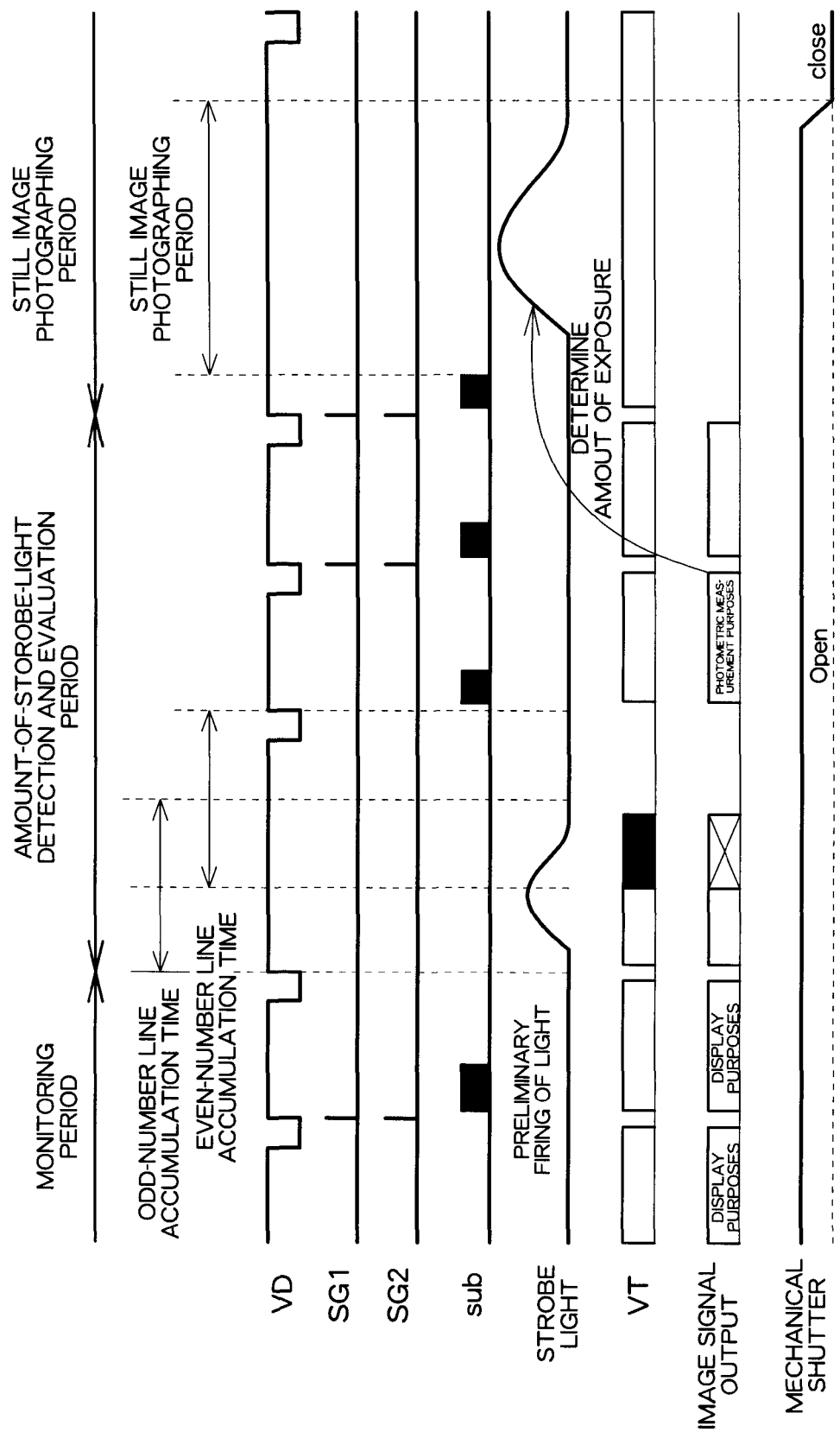
FIG. 7 is an operation timing chart of still another embodiment.

In the present embodiment, the read timing is changed in connection with the timing of firing of preliminary light. However, in connection the timing of preliminary flash light, strobe light control can also be performed by means of changing the accumulation start timing. FIG. 7 shows a timing chart achieved at this time. The difference between FIGS. 4 and 7 lies in that the accumulation start timing for the odd-number lines and the accumulation start timing for the even-number lines are located before a timing of preliminary light. Further, the odd-number line accumulation end timing (read timing) is located at a time in the middle of firing of preliminary light. The even-number line accumulation end timing (read timing) is located at a time after completion of firing of preliminary light. In contrast, in FIG. 7, the odd-number line accumulation end timing and the even-number line accumulation end timing are set at a time after completion of firing of preliminary light. Further, accumulation start timing of the odd-number line is set at a time before firing of preliminary light, and accumulation start timing of the even-number line is set at a time in the middle of firing of preliminary light. In the even-number lines, accumulation of electric charges is started from a time in the middle of firing of preliminary light. Hence, the amount of preliminary light fired in the odd-number lines and the amount of preliminary light fired in the even-number lines become different from each other by a single firing of preliminary light. In contrast with FIG. 4, the start timing of preliminary light can also be said to have been shifted to the accumulation start timing of the odd-number lines.

Moreover, in the present embodiment, the CCD may be divided into the odd-number line region and the even-number line region even for the case of firing of main flash light rather than for the case of firing of preliminary flash light; and read timing may be changed from one region to another region, thereby changing the amount of flash light from the strobe. For instance, the read timing of the odd-number line region is set to a time in the middle of firing of main flash light, and the read timing of the even-number line region is set to a time after completion of firing of main flash light. The image signal from the odd-number line region and the image signal from the even-number line region are processed by the image processor 50, and the thus-processed signals are displayed on the LCD 70 or stored in the memory card 54. The user can acquire two images of different amounts of light by means of single firing of a main flash light by the strobe 60. Interpolation of images is the same as mentioned previously.

Third Embodiment

In the second embodiment, when the read timing is changed in connection with the firing timing of the strobe 6, the read start timing of the odd-number line region is shifted from the read start timing of the even-number line region. The present embodiment describes a case where the read timing of the odd-number line region and the read timing of the even-number line region are matched with each other.

Figure 5:
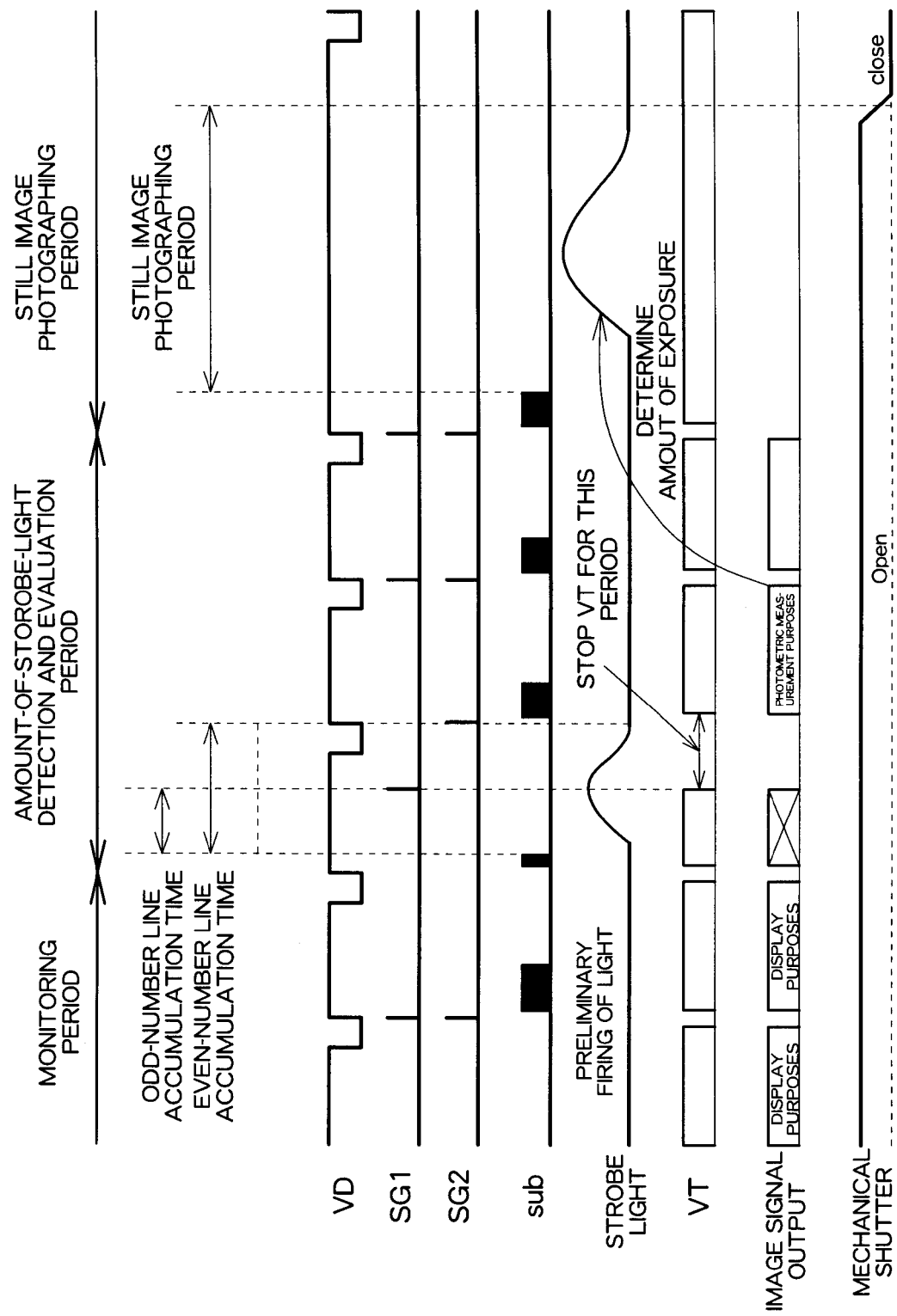
FIG. 5 is an operation timing chart of still another embodiment.

FIG. 5 shows an operation timing chart of a present embodiment. The system control digital signal processing LSI 50 controls the strobe 6 so as to fire preliminary light; evaluates the amount of light reflected from the subject during firing of preliminary light; and adjusts the amount of main flash light. The drive operation of the CCD 14 of the present embodiment is the same as that of the first embodiment. Firing of preliminary light for photometric measurement and firing of main light are combined with the drive operation. For the case of firing of preliminary light, timing is set in such a way that the read pulse signal SG1 for the odd-number lines is input in the course of firing of preliminary light, thereby intentionally causing a difference between the exposure of the odd-number lines to strobe light and the exposure of the even-number lines to strobe light. The thus-obtained image signals are used for photometric measurement, and the amount of main flash light subsequent to photometric measurement is determined. The odd-number line region is exposed until the middle of preliminary light, and the even-number line region is exposed until completion of preliminary light. Accordingly, two images of different imaging exposures can be obtained by means of a single firing of preliminary light. Consequently, when compared with a case where preliminary flash light is fired a plurality of times every time imaging exposure is changed, a photometric measurement time can be shortened.

Fourth Embodiment

In the first to third embodiments, the CCD 14 is divided into the odd-number line region and the even-number line region. The exposure of the odd-number lines to strobe light is made different from the exposure of the even-number lines to strobe light by means of changing the charge accumulation times from the odd-number line region to the even-number line region. The exposure can also be changed from one region to another region in the CCD 14 by means of another method. For example, electric charges are read on a per-line basis in a certain region A. In contrast, electric charges are read from another region B with a plurality of lines being added to the region. As a result, the exposure of the region B is increased by only an amount corresponding to the number of added lines. Thus, a plurality of image signals of different exposures can be simultaneously acquired through a single photography operation by means of dividing the CCD 14 into a region which is to be provided with additional lines and another region which is not provided with additional lines.

Figure 6:
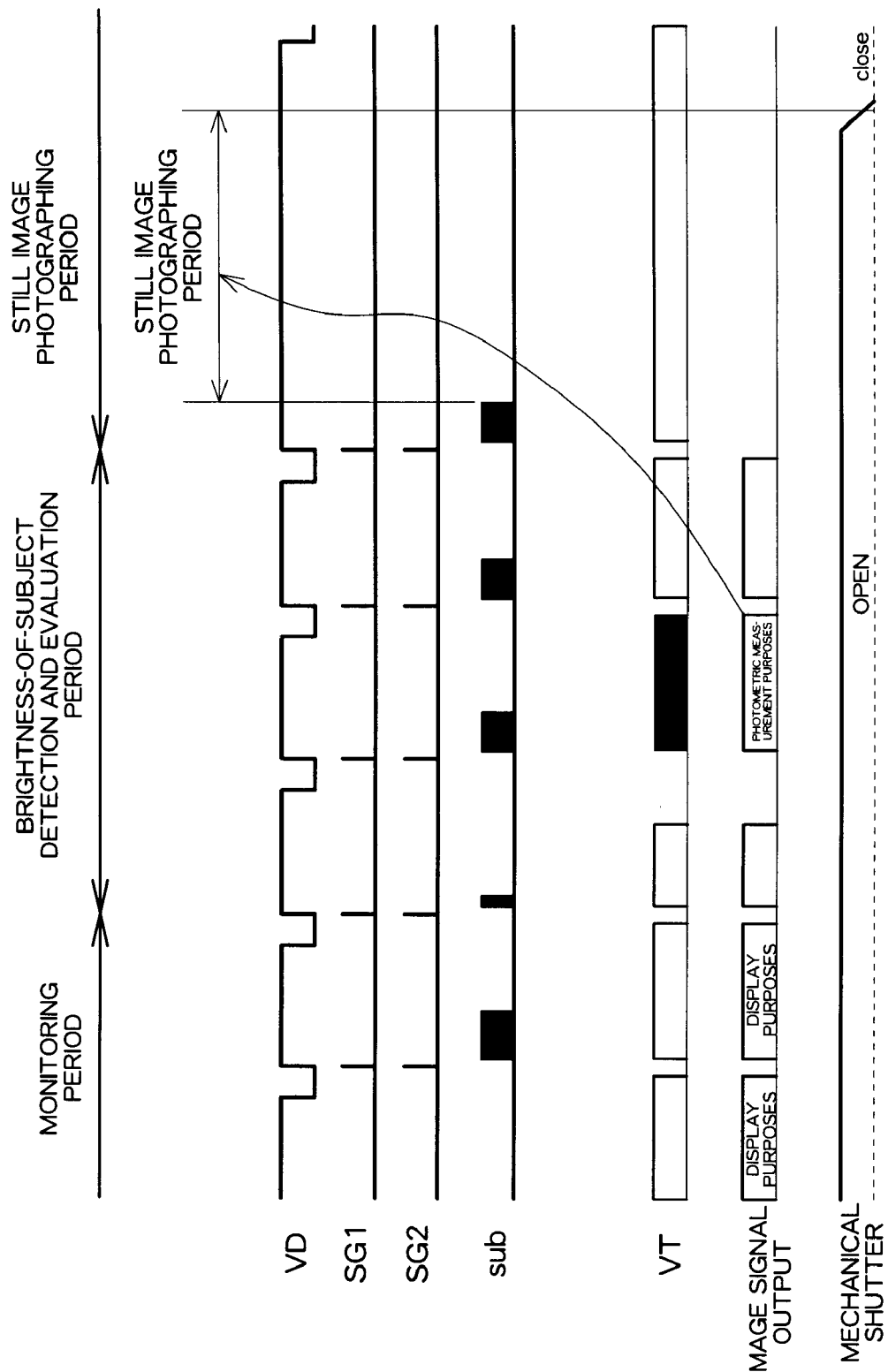
FIG. 6 is an operation timing chart of yet another embodiment.

FIG. 6 shows an operation timing chart of the present embodiment. In order to acquire an image signal for photometric measurement, the read pulse signals such as SG1, SG2 are the same as steady operations. In the drawing, vertical transfer operations of hatched areas indicated by the vertical transfer clock signal VT are different from ordinary operation. The term "steady operation" is a state where images of low resolution continuously photographed by the CCD 14 are displayed in the form of a moving image on the image display section 70 as an electronic finder to be used by the user in order to determine the angle of view at which a still image is photographed. In the present embodiment, the number of vertical transfer operations per horizontal transfer operation is intentionally changed in a hatched area which appears in the vertical transfer clock signal VT at the time of acquisition of an image for photometric measurement use, thereby changing the number of lines to be added. For instance, the number of odd-number lines in a finally-acquired image for photometric measurement use is set to one, and the number of even-number lines is set to four. Signal electric charges corresponding to four lines are added to the even-number lines in a horizontal transfer path, so that the even-number lines are four times as bright as the odd-number lines. The thus-acquired image which changes brightness from one line to another line is provided for photometric measurement as in the case of the first to third embodiments. According to the result of evaluation, appropriate exposure for photography of the next still image is determined.

In the present embodiment, it goes without saying that exposure can be adjusted in accordance with the number of lines to be added. Reading of an image signal per line and reading of an image signal with addition of "n" lines ("n" is a natural number of two or more) can be alternately performed.

Even in the present embodiment, as in the case of the above embodiments, the image signal read per line and the image signal read by addition of a plurality of lines are used not as signals for photometric measurement purposes but as image signals for autobracket photography purposes.

Fifth Embodiment

In the above-described embodiments, the CCD 14 is divided into an odd-line region and an even-line region, the amount of exposure is varied between the odd-line region and even-line region, an image signal is read, light is measured, and an optimum amount of illumination is determined based on the light measurement. In the fifth embodiment, a method for determining the optimum amount of illumination more quickly will be described. In the present embodiment, the amount of exposure is varied between the odd-line region and the even-line region, and only the image signal from the odd-line region is read first for measuring light. When the optimum amount of illumination can be determined based on the light measurement for the odd-line region, the even-line region is not read, to thereby reduce the processing time. When the optimum amount of illumination cannot be determined based on the light measurement for the odd-line region, the even-line region is then read for measuring light, and the optimum amount of illumination is determined based both on the odd-line region and the even-line region. For example, when the odd-line region is a region of relatively high exposure and the even-line region is a region of relatively low exposure, and the image signal read from the odd-line region would yield an appropriate amount of illumination, though the amount of illumination may result in a slight over-exposure, an appropriate amount of illumination is determined based solely on the image signal read from the odd-line region.

Figure 9:
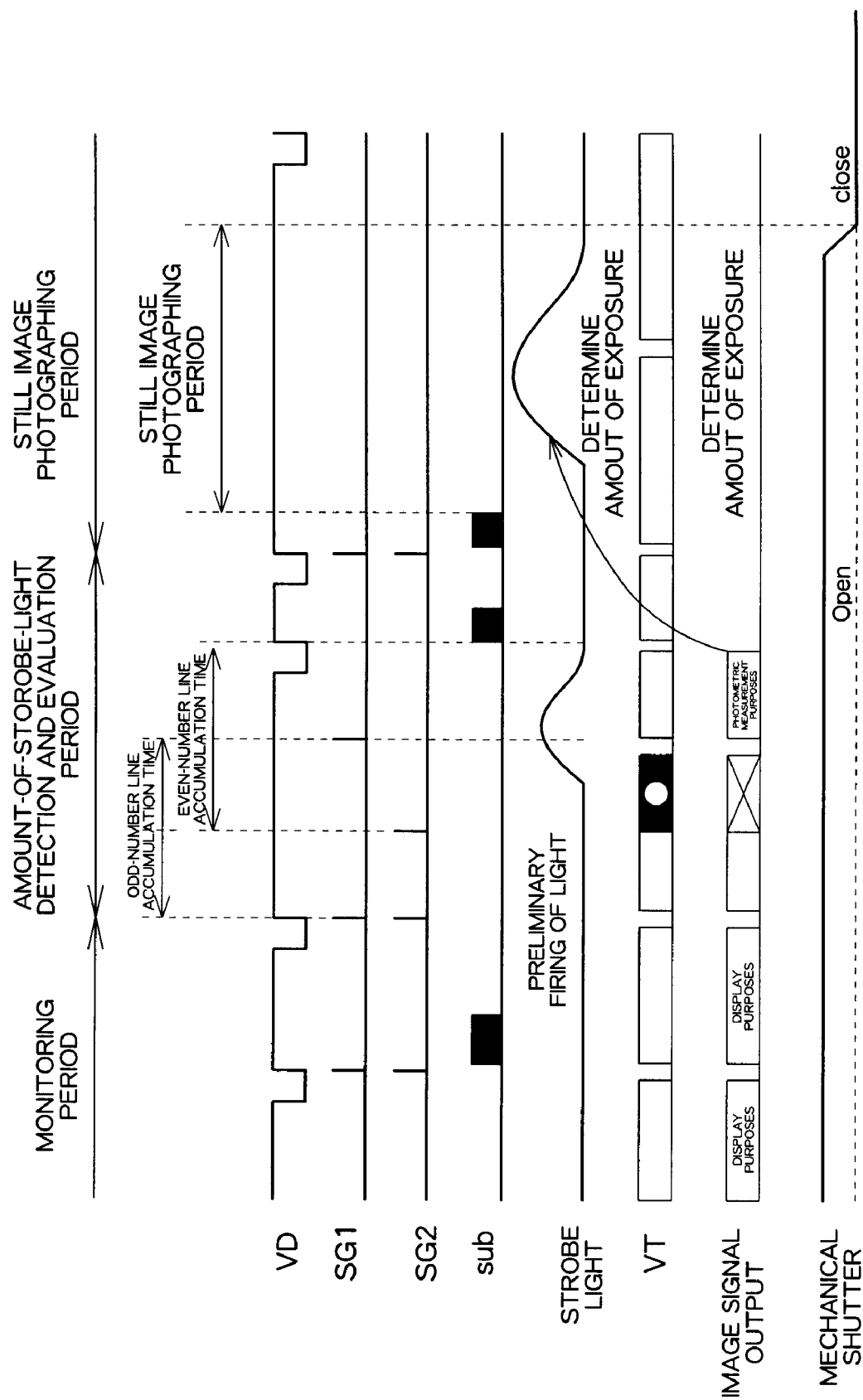
FIG. 9 is an operation timing chart of yet another embodiment.

FIG. 9 shows an operation timing chart for the present embodiment. FIG. 9 shows a case in which the amount of main illumination can be determined based solely on the reading of the odd-line region. Two pulses including SG1 and SG2 are supplied to the CCD 14 as reading pulses. The reading pulse SG1 is a pulse for reading accumulated charges from the odd-line region of the CCD 14 and the reading pulse SG2 is a pulse for reading accumulated charges from the even-line region of the CCD 14. First, with the reading pulse SG1, unnecessary charges accumulated in the light-sensitive photodiode in the odd-line region are read into a vertical transfer path, so that the odd-line region is reset and exposure of the odd-line is started. After a predetermined time has elapsed, with the reading pulse SG2, unnecessary charges accumulated in the light-sensitive photodiode in the even-line region are read into the vertical transfer path, so that the even-line region is reset and exposure of the even-line is started. Then, with the reading pulse SG1 which is again input after a predetermined time has elapsed, the accumulated charges on the odd-line are read into the vertical transfer path, to complete exposure of the odd-line. Before the completion of the exposure of the odd-line, the unnecessary, redundant charges on the vertical transfer path are discharged and reset with a high-speed vertical transfer VT clock. The hatching shown by the vertical transfer clock VT shows the discharging operation. In the second embodiment shown in FIG. 4, the accumulated charges on the even-line are read with the reading pulse SG2 following the reading pulse SG1, but in the present embodiment, light is measured using the accumulated charges on the odd-line read with the reading pulse SG1 prior to reading the even-line with the reading pulse SG2, and the amount of main illumination is determined. In this case, the accumulated charges on the even-line are not read with the reading pulse SG2.

Figure 10:
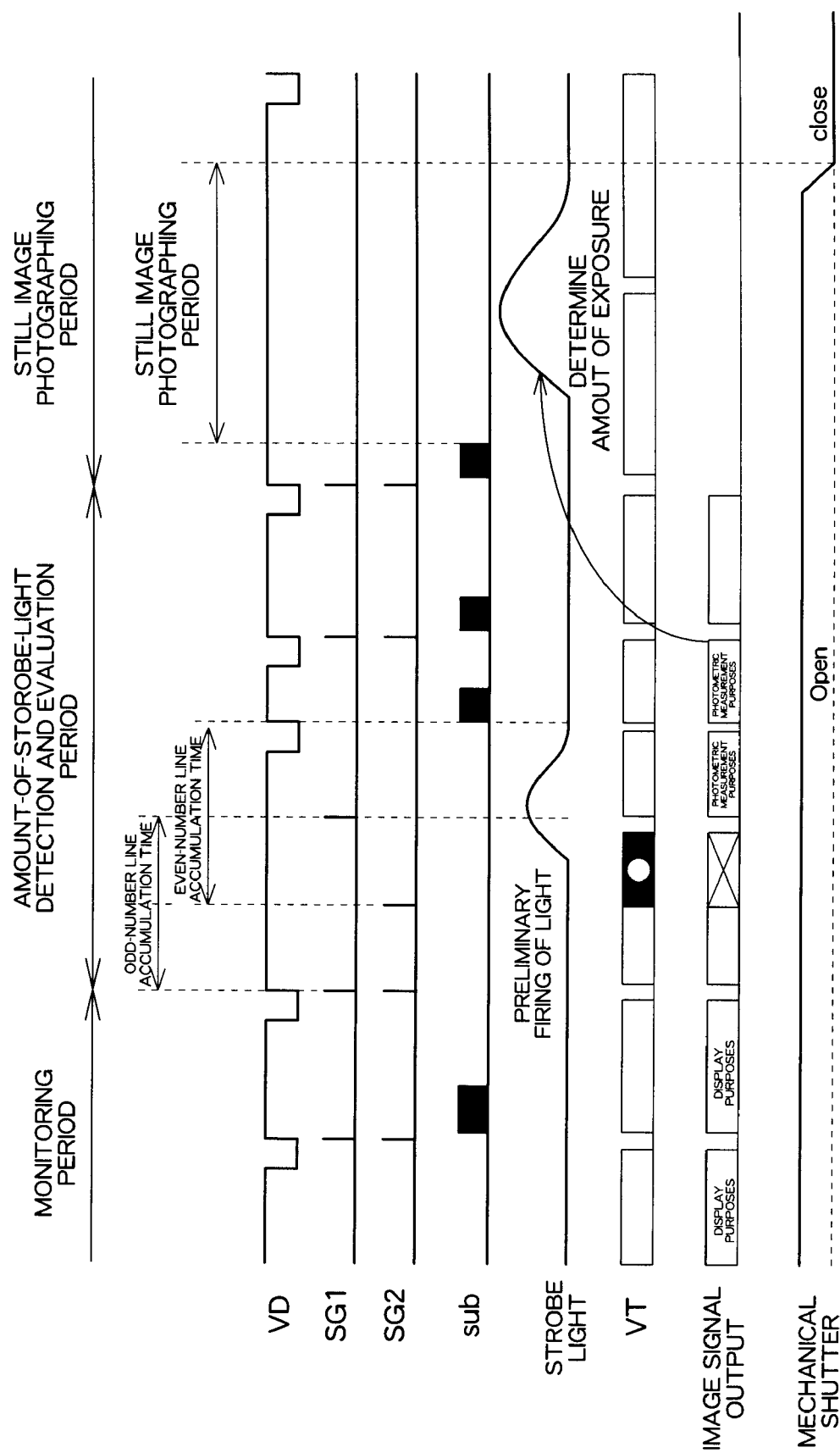
FIG. 10 is an operation timing chart of still another embodiment.

FIG. 10 is an operation timing chart for a case in which the amount of main illumination cannot be determined based solely on the reading of the odd-line region. In this case, the operation is basically similar to that of the second embodiment shown in FIG. 4. That is, after the accumulated charges on the odd line are read with the reading pulse SG1, the accumulated charges on the even line are read with the reading pulse SG2, light is measured with the image signal read from the odd line and the image signal read from the even line, and the amount of main illumination is determined.

In this manner, the image signal of the odd-line region is first read, and when the amount of main illumination can be determined based solely on the read image signal, the reading of the image signal of the even-line region is not necessary, and thus the processing time until the amount of main illumination is determined can be shortened. Alternatively, it is also possible to employ a configuration in which the image signal is first read from the even line, it is determined whether or not the amount of main illumination can be determined based solely on the read image signal, and the reading of the odd line is cancelled when the amount of main illumination can be determined. In addition, although in the present embodiment, the strobe unit 6 is preliminarily illuminated to determine the amount of illumination during main illumination, when a device does not have a strobe unit 6 or when the device has a strobe unit 6 but the strobe unit 6 is not illuminated, an appropriate amount of exposure can be determined through a similar process. This corresponds to the first embodiment shown in FIG. 3. More specifically, in the first embodiment, the accumulated charges on the odd line are read with the reading pulse SG1, and then the accumulated charges on the even line are read with the reading pulse SG2. In the current process, the light is measured before the accumulated charges on the even line are read, by supplying the image signal of the odd line into the system control digital signal processor LSI 50, and an appropriate amount of exposure is determined. When an appropriate amount of exposure can be determined, the reading of the even line is not executed, and the reading of the even line with the reading pulse SG2 is executed only when an appropriate amount of exposure cannot be determined, and an appropriate amount of exposure is determined based both on the image signal of the odd line and the image signal of the even line.

In FIGS. 4 and 9, the amount of exposure is varied by varying the exposure start timing and the exposure stop timing between the odd line and the even line. Alternatively, the amount of exposure can be varied by only varying the exposure start timing between the odd line and the even line, and making the exposure stop timing approximately coincident. More specifically, a configuration may be employed in which the exposure stop timing for the odd line is set to the preliminary illumination completion timing identical to the exposure stop timing of the even line, the exposure start timing of the odd line is set to a timing prior to the preliminary illumination, and the exposure start timing of the even line is set to a timing during the preliminary illumination.

Furthermore, in the present embodiment, the CCD 14 is divided into an odd-line region and an even-line region, that is, the CCD 14 is divided along the vertical direction (up-and-down direction), but the present invention is not limited to such a configuration, and it is also possible to employ a configuration in which the CCD 14 is horizontally divided (left-and-right direction). More specifically, the CCD 14 may, for example, be logically divided into two regions at left and right, and the amount of exposure can be varied between the left region and the right region. In this case also, the light can be measured using both the image signals of the left region and the right region, or alternatively, a configuration may be employed in which the image signal of the left region is first read, light is measured, reading of the right region is cancelled when an appropriate amount of exposure or the amount of main illumination can be determined, and the image signal of the right region is read when an appropriate amount of exposure or the amount of main illumination cannot be determined based solely on the image signal of the left region.

PARTS LIST 3 lens module
6 strobe
7 light control circuit
14 CCD
15 V driver
16 actuator driver
24 analog front-end
36 A/D converter
40 timing generator
42 user interface
50 digital signal processing
54 image recording section
56 memory
60 strobe
70 image display section
100 area
100a odd-number line region
100b even-number line region
SG1 pulse signal
SG2 pulse signal

What is claimed is:

1. An imaging apparatus comprising:
   an image sensor;
   a strobe unit;
   a preliminary illumination controller which instructs the strobe unit to preliminarily illuminate for a predetermined period before main illumination;
   a reading controller which divides the image sensor into a plurality of regions, controls an exposure period for each region, corresponding to the preliminary illumination, and reads an image signal from each of the regions; and
   an imaging exposure setting unit which sets an appropriate amount of strobe light to be tired during imaging according to the image signals read from the regions; wherein the reading controller controls the exposure period for each region so that an overlapping period of each region with the preliminary illumination period of the strobe unit is different from each other.

2. The imaging apparatus according to claim 1, wherein the reading controller changes the start timing of the exposure period for each region.

3. The imaging apparatus according to claim 1, wherein the reading controller changes the end timing of the exposure period for each region.

* * * * *